United States Patent [19]

Oakes

[11] Patent Number: 4,686,345
[45] Date of Patent: Aug. 11, 1987

[54] METHOD OF REBUILDING A STRIP MILL GUIDE

[76] Inventor: Grant A. Oakes, 3605 Warren Meadville Rd., Cortland, Ohio 44410

[21] Appl. No.: 743,307

[22] Filed: Jun. 10, 1985

[51] Int. Cl.[4] ................................................. B23K 9/04
[52] U.S. Cl. .............................. 219/76.14; 219/137 R
[58] Field of Search ........................ 219/76.14, 137 R; 228/119

[56] References Cited

U.S. PATENT DOCUMENTS

| | | | |
|---|---|---|---|
| 2,166,700 | 7/1939 | Bennett | 219/76.14 |
| 2,494,970 | 1/1950 | Shea | 219/76.14 X |
| 3,289,292 | 12/1966 | Oakes | 228/125 |
| 3,289,457 | 12/1966 | Oakes | 72/428 |
| 3,589,876 | 6/1971 | Oakes | 428/645 |
| 4,521,664 | 6/1985 | Miller | 219/76.14 |

OTHER PUBLICATIONS

Cary, Howard B. *Modern Welding Technology*, Englewood Cliffs, New Jersey: Prentice-Hall, Inc., 1979, pp. 94, 299-300.
Lyman, Taylor, et al. *Metals Handbook*, Metals Park Ohio: American Society for Metals, 1971, pp. 164-165, 217.

*Primary Examiner*—E. A. Goldberg
*Assistant Examiner*—C. M. Sidga
*Attorney, Agent, or Firm*—Harpman & Harpman

[57] ABSTRACT

A method of rapidly and inexpensively rebuilding strip mill guides which are formed of a copper material having some percentage of lead therein utilizes a copper welding rod having a diameter of one-quarter inch and a 600 ampere arc welding current. The method also includes reshaping a wear area that extends longitudinally of the strip mill guide.

6 Claims, 7 Drawing Figures

METHOD OF REBUILDING A STRIP MILL GUIDE

BACKGROUND OF THE INVENTION

1. Technical Field

This invention relates to strip mill guides of the type normally employed to guide the edges of strip between the stands of a rolling mill and a method of rebuilding them.

2. Description of the Prior Art

Prior structures of this type are those seen in my U.S. Pat. Nos. 3,289,457, 3,289,292, and 3,589,876 in which built up strip mill guides and the method of making the same are disclosed. The inventions set forth in these patents and particularly in U.S. Pat. No. 3,589,876, have been widely commercially adopted by the steel industry and such built up strip mill guides have been reworked according to U.S. Pat. No. 3,589,876. Such rebuilt guides have heretofore been largely limited to those in which the edges of the steel strip being guided have formed relatively uniform longitudinally straight grooves in the guides and wherein the width of the grooves thus formed may be filled with a suitable alloy integrally welded to the guide. Many strip mill guides become incapable of being rebuilt due to the tendency of the steel strip emerging from the reducing rolls to buckle or ripple and thereby create an irregular shaped groove in the guide and/or a series of laterally spaced grooves, some of which are longitudinally straight and some of which are irregular and undulating longitudinally of the guide.

The present invention makes it possible to rework such unusually worn guides and rebuild the same satisfactorily. Strip mill guides rebuilt in accordance with the present invention may be repeatedly reworked and rebuilt and found to be improved in their lifespan characteristics and wearing ability.

SUMMARY OF THE INVENTION

A method of rebuilding a strip mill guide having unusual wear imparted configurations longitudinally thereof reshapes the wear configurations laterally and longitudinally and enlarges the area thereof to the extent that it is difficult to obtain a good fusion zone for the weld metal to be applied, uses a weld rod of approximately double the diameter of the weld wire or weld rods heretofore known in the art and with a manual metal arc process weld with increased power sufficient to melt not only the oversized rod, but also supply sufficient heat to penetrate the larger irregular area to be rebuilt.

The present invention not only improves the original metal of the guide, particularly with respect to wear characteristics and grain structure but permits the guide to be rebuilt periodically to replace the worn away metal, and of equal importance, the increased area being rebuilt and the increased volume of the larger rod employed and the substantially increased power used results in less turbulence in the melted metal being applied and the elimination of the porosity in welds without a cover gas or weld rod coating. Additionally, the present invention provides for a greatly improved deposit rate of more than thirty pounds of metal per hour which considerably reduces the time necessary to rebuild a worn strip mill guide and thus substantially reduces the cost thereof.

DESCRIPTION OF THE PREFERRED EMBODIMENT

Figure 1:
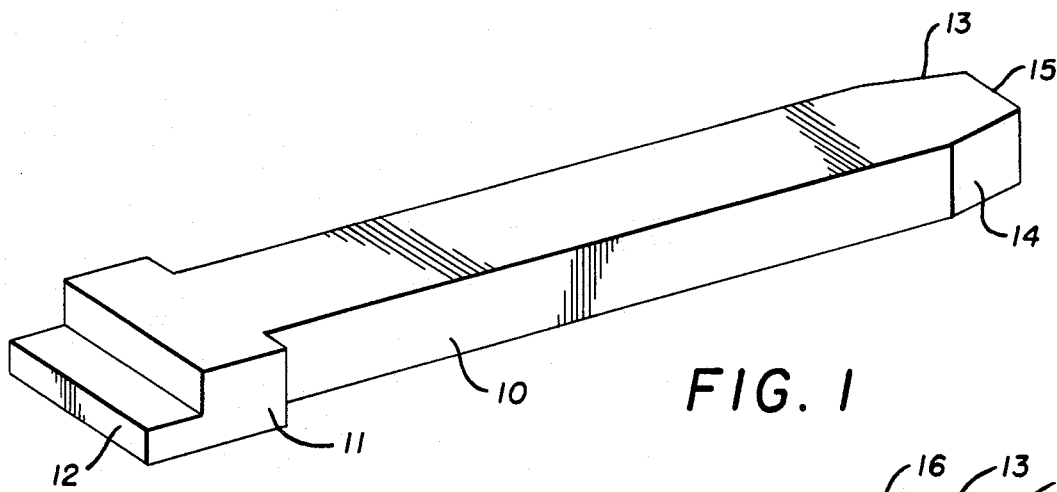
FIG. 1 is a perspective view of a built up strip mill guide formed in accordance with this invention.

By referring to the drawings and FIG. 1 in particular, it will be seen that a strip mill guide has been disclosed which is of conventional size and shape and in the example chosen for illustration the guide is approximately thirty three inches long by three and one half inches in width and one inch in thickness. It has a T-head at one end, the guide body being indicated by the numeral 10 and the T-head being indicated by the numeral 11. The T-head is formed with a projecting extension 12 of lesser height than the remainder of the head 11 of the strip mill guide so that it will fit beneath a mounting member in a conventional mounting means positioned alongside the pass line of a strip mill, for example, and adjacent a stand of reducing rolls therein.

The opposite end of the strip mill guide 10 has angular end portions 13 and 14 which angle toward one another and terminate with a relatively narrow end portion 15 which is positioned immediately adjacent said reducing rolls. As seen in FIG. 1 of the drawings, the strip mill guide is in condition for installation in the guide means of a strip mill.

Figure 2:
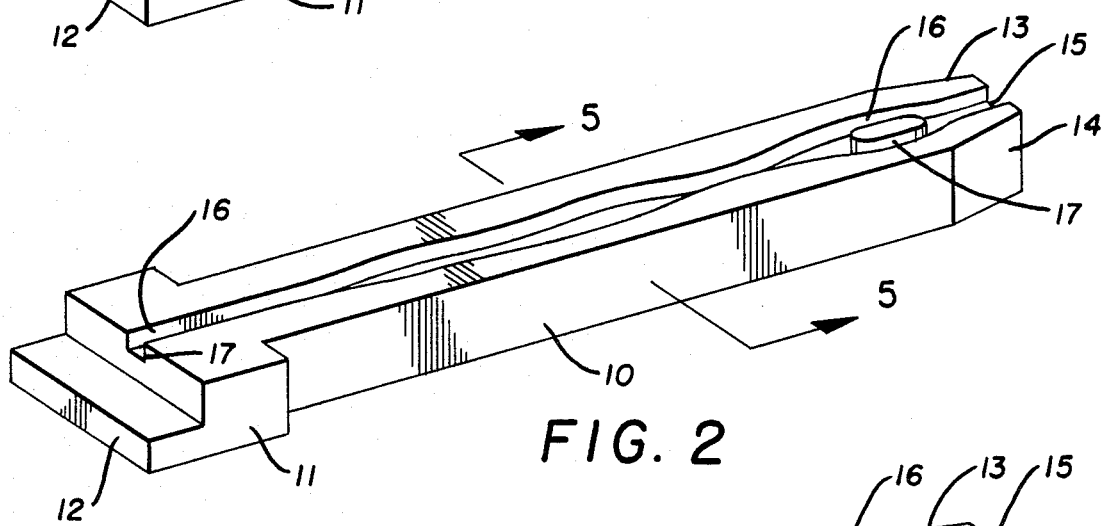
FIG. 2 is a perspective view of a strip mill guide showing the unusual wear-shaped grooves formed therein when the steel strip being guided moves in other than a straight line.

By referring to FIG. 2 of the drawings, the same strip strip mill guide will be seen in perspective elevation with a plurality of longitudinally extending grooves 16 and 17 therein and which grooves 16 and 17 extend from the end portion 15 to the T-head portion 11 and the projecting extension 12 as hereinbefore referred to. The grooves 16 and 17 are formed in the strip mill guide body 10 by the longitudinal edges of steel strip traveling between the stands of rolls in a rolling mill. It will be observed that the grooves 16 and 17 are irregular in longitudinal configuration as a result of bowing or rippling of the steel strip emerging from a stand of rolls in the rolling mill and that they form unusually wide and deep grooves in the strip mill guide, it being understand that there are a pair of such strip mill guides, one on either side of the pass line of the rolling mill and arranged to engage and guide the longitudinal edges of the steel strip traveling between the stands of rolls in the rolling mill.

Those skilled in the art will observe that the resultant wear pattern comprising the irregularly shaped grooves 16 and 17 contrast greatly with the more normal wear pattern occuring in strip mill guides such as illustrated for example in my prior U.S. Pat. No. 3,589,876 wherein the longitudinal groove 16 is longitudinally straight and of relatively narrow width and depth.

It has become customary in the art to rebuild the strip mill guides as disclosed in my aforesaid U.S. Pat. No. 3,589,876 by electric arc welding wherein a welding rod held by an electric arc torch is supplied sufficient electric current to melt the metal of the welding rod and heat the area of the groove in the strip mill guide so that a desirable fusion of the weld metal with the metal of the strip mill guide takes place. Heretofore, the largest diameter welding rod available for use in such welding operations has been three-sixteenth inch with most of the welding rod used commercially being of smaller diameter. In welding with a three-sixtheeth inch diameter welding rod, electric current at between 225 to 320 amperes is necessary to melt the metal and heat a relatively small fusion area of the article to which the welding rod metal is applied. Heretofore, the largest available electrode holder has been rated at a maximum current capacity of 500 amperes. The problem of attempting to rebuild a strip mill guide having a badly worn multiple groove or a single enlarged groove condition as hereinbefore described in connection with FIG. 2 of the drawings with the prior state of the art equipment has been insurmountable.

The present invention provides a satisfactory solution to this longstanding problem by forming a welding rod of a quarter inch diameter or larger and providing an electrode holder capable of safely handlong 800 amperes and supplying the electrode holder and the large diameter welding rod with sufficient electrical current from a pair of 600 ampere welding machines to realize at least 80% duty cycle (per hour).

Figure 4:
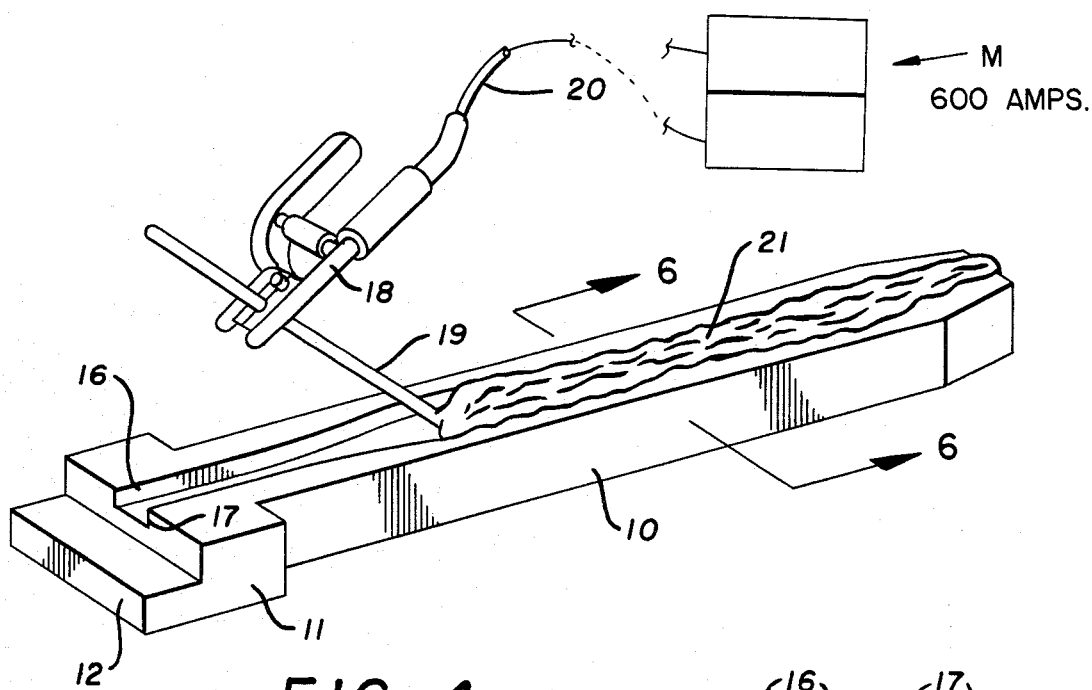
FIG. 4 is a perspective view of the strip mill guide of FIG. 3 during the rebuilding of the reshaped wear grooves therein.
Figure 5:
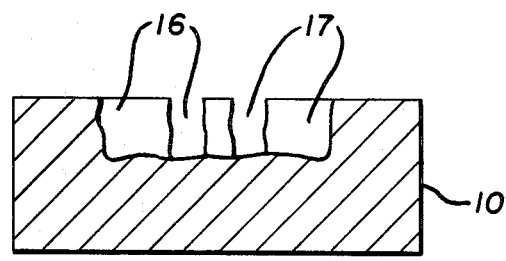
FIG. 5 is a vertical section on line 5—5 of FIG. 2 in enlarged detail.

In FIG. 4 of the drawings, such an improved and enlarged electrode holder is indicated by the numeral 18 and the welding rod having a diameter of at least a quarter inch is indicated by the numeral 19 and the conductor 20 is of a size to safely and efficiently handle the power output of a pair of 600 ampere electric welding machines M which are necessary to develop sufficient power for the purpose.

Figure 3:
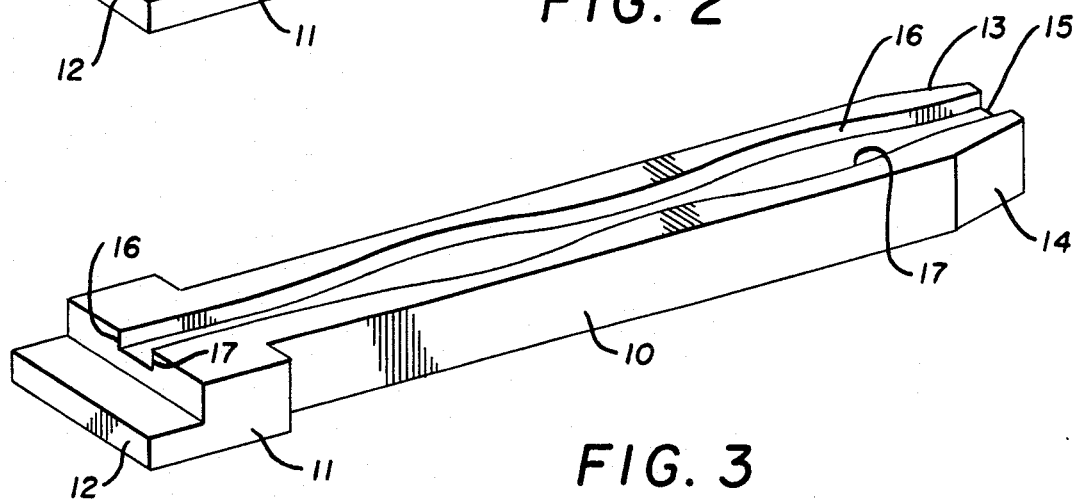
FIG. 3 is a perspective view of the strip mill guide of FIG. 2 following the mechanical reshaping of the wear grooves therein.

By referring to FIG. 3 of the drawings, it will be seen that the grooves 16 and 17 in the strip metal guide have been machines so as to remove the metal lying between the grooves 16 and 17 and on opposite sides of the grooves to more uniformly shape the irregular and/or undulating configurations of the grooves 16 and 17 and form a single widened elongated cavity in the strip mill guide 10. Such reshaping of the grooves 16 and 17 is not always necessary, but has been found desirable in many instances in providing a more uniform channel in which the substantially larger amount of the weld metal is deposited as illustrated in FIG. 4 of the drawings.

By referring again to FIG. 4 of the drawings, it will be seen that the deposited metal is generally indicated by the numeral 21 and that it completely fills the channel formed by the grooves 16 and 17 in the preheated strip mill guide. Preheating to at least 800° F. is preferred.

Figure 6:
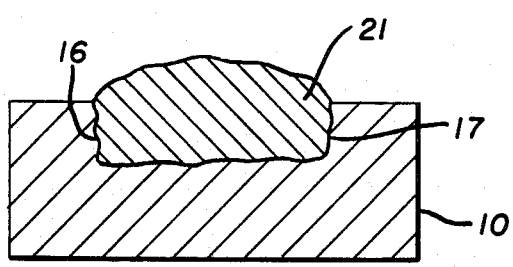
FIG. 6 is a vertical section on line 6—6 of FIG. 4 in enlarged detail.
Figure 7:
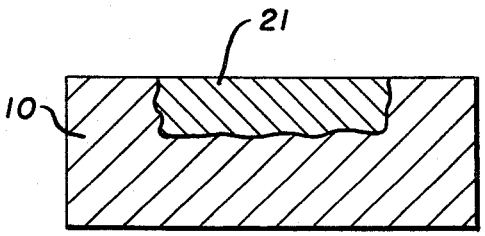
FIG. 7 is a vertical section in enlarged detail of the section of the guide illustrated in FIG. 6 and after the excess weld metal has been removed to form a transversely smooth guide surface.

In FIG. 6 of the drawings, which is a vertical section on line 6—6 of FIG. 4, the deposited metal 21 will be seen in cross section as deposited in the channel formed by the grooves 16 and 17 and in FIG. 7 of the drawings, the metal above the surface of the strip mill guide 10 has been machined so that there is a uniformly flat smooth wearing surface on the rebuilt strip mill guide 10.

The rebuilding of unusually worn strip mill guides, such as this invention is directed toward, makes possible the economic rebuilding of the strip mill guides and their repeated rebuilding and reuse and results in a rebuilt strip mill guide having improved wearing characteristics in that the rebuilt area of the guide is substantially wider than the rebuilt areaa of strip mill guides as heretofore known in the art as disclosed for example in my aforesaid U.S. Pat. No. 3,589,876. A considerably improved rebuilt metal area results because the increased volume of molten metal being deposited is considerably less turbulent than when a small amount is deposited and is therefore free of porosity which improves wear life and at the same time improves fusion with the preheated metal of the strip mill guide.

Of equal importance is the additional benefit that while the previous metal deposit rates of four to five pounds per hour for the stick process and ten to twelve pounds per hour for the MIG process are greatly exceeded with the present invention by which, using a one-quarter inch diameter welding rod over thirty pounds per hour of metal can be satisfactorily deposited.

The importance of the present invention will be recognized by the fact that the excessively worn and irregularly worn strip mill guides can be rebuilt by rewelding and the rebuilding performed a number of times while maintaining the alloy of the guide in its desirable non-brittle state.

The typical strip mill guide referred to herein is 80% copper, 10% tin, and 10% lead and has a normal fine grain structure which forms a suitable supporting body for the rebuilt area formed therein by this invention. The alloy of the welding rod 19 shown flowing into the grooves 16 and 17 is high in lead and tin and preferably includes a small amount of nickel, an alloy consisting of 78% copper, 10% lead, 10% tin and 2% nickel is suitable. The lead may be present in the alloy in percentages running from 10% to 12%. The tin may be from 9% to 11% of the alloy and the balance copper except for the nickel which can be present in percentage from 1% to 2% and under some conditions may be eliminated, such as where the lead and tin content are very high.

Those skilled in the art will observe that the heat necessary to weld the metal in the grooves 16 and 17 or the channel resulting from the machining of these grooves as hereinbefore described is sufficient to remove or relocate the tin and lead of the strip mill guide 10 wherein dendritic growth of the grain structure occurs and which results in an unsatisfactory strip mill guide as it becomes brittle, easy broken and subject of rapid wear. By utilizing the alloy disclosed herein which is high in tin and lead and preferably has nickel as a stabilizer, the heretofore believed normal migration of the tin and lead is prevented and no dendritic grain structure growth occurs. The alloy of the strip mill guide and the alloy of the welding rod as disclosed in this invention are similar to those disclosed in my aforesaid U.S. Pat. No. 3,589,876, but the desirable characteristics obtained by using the alloy of U.S. Pat. No. 3,589,876 are greatly improved by the substantially increased area in which the alloy of the welding rod is deposited in increased volume as the migration of the lead of the tin constituents in a bronze alloy strip mill guide to the last heat affected zone is prevented by the increased area of the deposited metal in the increased channel size resulting from the irregular shaped grooves in the unusual wear pattern of the strip mill guides being rebuilt. In other words, the lead and tin constituents of the bronze alloy of the strip mill guide body 10 tend to move into the areas away from the weld and towards the center of the guide leaving the areas adjacent the weld relatively free of lead and tin and thus accelerating the dendritic grain structure which leads to the failure of the strip mill guide as it becomes brittle, easily broken and is subjected to rapid wear. By substantially increasing the amount of the alloy deposited in the grooves and/or channels in the strip mill guide as required by their substantially greater area, satuation of the guide metal by the migration of the lead and the tin of the alloy inhibit the dendritic growth and thus maintain the strip mill guide in desirable condition.

It will thus be seen that the built up strip mill guide disclosed herein comprises a substantial improvement in the art and makes possible the reuse of severely worn guides and those having unusual wear patterns and permits their continuous use through a series of rebuilding operations, none of which adversely affect the grain structure of the original guide body.

Although but one embodiment of the present invention has been illustrated and described, it will be apparent to those skilled in the art that various changes and modifications may be made therein without departing from the spirit of the invention and having thus described my invention, what I claim is:

1. The method of rebuilding a strip mill guide formed principally of copper and having lead therein, and having more than one longitudinally extending irregularly shaped groove therein forming at least one longitudinally extending channel in at least one location longitudinally of said strip mill guide comprising steps of preheating said strip mill guide, providing a welding rod formed principally of copper and having a diameter of one quarter inch, positioning the welding rod in an electrode holder capable of conducting at least 800 ampere arc welding electric current to said welding rod, establishing conductors between said electrode holder and a source of at least 600 ampere arc welding electric current and said strip mill guide, energizing said source of arc welding current so as to deliver between 600 and 800 amperes arc welding electric current to said welding rod and moving said welding rod along said grooves and channel in said strip mill guide so as to maintain an electric arc whereby said strip mill guide is heated and said welding rod is melted and deposited in said grooves and channel.

2. The method of rebuilding a strip mill guide set forth is claim 1 and wherein said strip mill guide is preheated to about 800° F. prior to depositing said melted welding rod in said grooves and channel.

3. The method of rebuilding a strip mill guide set forth in claim 1 and wherein said source of said 600 to 800 amperes arc welding electric current consists of a pair of 600 ampere machines.

4. The method of rebuilding a strip mill guide set forth in claim 1 and wherein sections of said strip mill guide between said longitudinally extending irregularly shaped grooves are removed to form a single longitudinally extending channel in said strip mill guide.

5. The method of rebuilding a strip mill guide set forth in claim 1 and wherein sections of said strip mill guide on opposite sides of said longitudinally extending irregularly shaped grooves are removed to form oppositely disposed undulating sides of said grooves and a widened channel therebetween.

6. The method of rebuilding a strip mill guide set forth in claim 1 wherein said strip mill guide comprises an elongated member consisting essentially of 80% copper, 10% lead and 10% tin and wherein said welding rod consists essentially of copper in an amount between 25% and 77%, lead in an amount between 11% and 45% and tin in an amount between 11% and 30%.

* * * * *